(12) United States Patent
Ostrand et al.

(10) Patent No.: US 8,151,146 B2
(45) Date of Patent: Apr. 3, 2012

(54) TOOL FOR PREDICTING FAULT-PRONE SOFTWARE FILES

(75) Inventors: Thomas Ostrand, Metuchen, NJ (US); Robert Bell, Murray Hill, NJ (US); Andrew Gauld, Middletown, NJ (US); Elaine Weyuker, Metuchen, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 884 days.

(21) Appl. No.: 12/137,282

(22) Filed: Jun. 11, 2008

(65) Prior Publication Data

US 2009/0313605 A1    Dec. 17, 2009

(51) Int. Cl.
G06F 11/00 (2006.01)
(52) U.S. Cl. ..................................... 714/47.1
(58) Field of Classification Search ................ 714/25, 714/47.1; 717/124, 140, 143
See application file for complete search history.

(56) References Cited

U.S. PATENT DOCUMENTS

| | | | | |
|---|---|---|---|---|
| 7,954,090 | B1* | 5/2011 | Qureshi et al. | 717/127 |
| 2004/0088278 | A1* | 5/2004 | Westmacott | 707/1 |
| 2005/0223354 | A1* | 10/2005 | Drissi et al. | 717/114 |
| 2006/0041864 | A1* | 2/2006 | Holloway et al. | 717/124 |
| 2011/0067009 | A1* | 3/2011 | Hosokawa et al. | 717/132 |

OTHER PUBLICATIONS

E.N. Adams, "Optimizing Preventive Service of Software Products," IBM J. Res. Develop., pp. 2-14, vol. 28, No. 1 (Jan. 1984).
E. Arisholm and L.C. Briand, "Predicting Fault-Prone Components in a Java Legacy System," Proc. ACM/IEEE ISESE, Rio de Janeiro (2006).
V.R. Basili and B.T. Perricone, "Software Errors and Complexity: an Empirical Investigation," Communications of the ACM, pp. 42-52, vol. 27, No. 1 (Jan. 1984).
R.M. Bell, T.J. Ostrand, E.J. Weyuker, "Looking for Bugs in All the Right Places," Proc. ACM/International Symposium on Software Testing and Analysis (ISSTA2006), Portland, Maine, pp. 61-71 (Jul. 2006).
S.R. Chidamber and C.F. Kemerer, "A Metrics Suite for Object Oriented Design," IEEE Transactions on Software Engineering, pp. 476-493, vol. 20, No. 6 (Jun. 1994).
G. Denaro and M. Pezzè, "An Empirical Evaluation of Fault-Proneness Models," Proc. International Conf. on Software Engineering (ICSE2002), Miami, USA (May 2002).
S.G. Eick, T.L. Graves, A.F. Karr, J.S. Marron, A. Mockus, "Does Code Decay? Assessing the Evidence from Change Management Data," IEEE Transactions on Software Engineering, pp. 1-12, vol. 27, No. 1 (Jan. 2001).

(Continued)

*Primary Examiner* — Scott Baderman
*Assistant Examiner* — Yair Leibovich
(74) *Attorney, Agent, or Firm* — Hoffmann & Baron, LLP

(57) ABSTRACT

A method, apparatus, and computer-readable medium for predicting the fault-proneness of code units (files, modules, packages, and the like) of large-scale, long-lived software systems. The method collects information about the code units and the development process from previous releases, and formats this information for input to an analysis stage. The tool then performs a statistical regression analysis on the collected data, and formulates a model to predict fault counts for code units of the current and future releases. Finally, the method computes an expected fault count for each code unit in the current release by applying the formulated model to data from the current release. The expected fault counts are used to rank the release units in descending order of fault-proneness so that debugging efforts and resources can be optimized.

20 Claims, 1 Drawing Sheet

Top-level flowchart for automated tool

OTHER PUBLICATIONS

N. E. Fenton and N. Ohlsson, "Quantitative Analysis of Faults and Failures in a Complex Software System," IEEE Trans. on Software Engineering, pp. 797-814, vol. 26, No. 8 (Aug. 2000).

T.L. Graves, A.F. Karr, J.S. Marron and H. Siy, "Predicting Fault Incidence Using Software Change History," IEEE Trans. on Software Engineering, pp. 653-661, vol. 26, No. 7 (Jul. 2000).

L. Guo, Y. Ma, B. Cukic and H. Singh, "Robust Prediction of Fault-Proneness by Random Forests," Proc. ISSRE 2004, Saint-Malo, France (Nov. 2004).

L. Hatton, "Reexamining the Fault Density—Component Size Connection," IEEE Software, pp. 89-97 (Mar./Apr. 1997).

T.M. Khoshgoftaar, E.B. Allen, K.S. Kalaichelvan and N. Goel, "Early Quality Prediction: A Case Study in Telecommunications," IEEE Software, pp. 65-71 (Jan. 1996).

T.M. Khoshgoftaar, E.B. Allen and J. Deng, "Using Regression Trees to Classify Fault-Prone Software Modules," IEEE Trans. on Reliability, pp. 455-462, vol. 51, No. 4 (Dec. 2002).

A. Mockus and D.M. Weiss, "Predicting Risk of Software Changes," Bell Labs Technical Journal, pp. 169-180 (Apr.-Jun. 2000).

K.H. Möller, D.J. Paulish, "An Empirical Investigation of Software Fault Distribution," Proc. IEEE First International Software Metrics Symposium, Baltimore, MD., pp. 82-90 (May 21-22, 1993).

J.C. Munson and T.M. Khoshgofttar, "The Detection of Fault-Prone Programs," IEEE Trans. on Software Engineering, pp. 423-433, vol. 18, No. 5 (May 1992).

N. Ohlsson and H. Alberg, "Predicting Fault-Prone Software Modules in Telephone Switches," IEEE Trans. on Software Engineering, pp. 886-894, vol. 22, No. 12 (Dec. 1996).

T.J. Ostrand and E.J. Weyuker, "The Distribution of Faults in a Large Industrial Software System," Proc. ACM/International Symposium on Software Testing and Analysis (ISSTA2002), Rome, Italy, pp. 55-64 (Jul. 2002).

T.J. Ostrand, E.J. Weyuker and R.M. Bell, "Where the Bugs Are," Proc. ACM/International Symposium on Software Testing and Analysis (ISSTA 2004), Boston, MA (Jul. 11-14, 2004).

T.J. Ostrand, E.J. Weyuker and R.M. Bell, "Predicting the Location and Number of Faults in Large Software Systems," IEEE Trans. on Software Engineering, pp. 1-16, vol. 31, No. 4 (Apr. 2005).

M. Pighin and A. Marzona, "An Empirical Analysis of Fault Persistence Through Software Releases," Proc. IEEE/ACM ISESE 2003, pp. 206-212.

G. Succi, W. Pedrycz, M. Stefanovic and J. Miller, "Practical Assessment of the Models for Identification of Defect-prone Classes in Object-Oriented Commercial Systems Using Design Metrics," Journal of Systems and Software, pp. 1-12, vol. 65, No. 1. (Jan. 2003).

D.R. Graham, "The Cost of Testing," Encyclopedia of Software Engineering, J.J. Marciniak, ed., John Wiley, p. 1335 (1994).

* cited by examiner

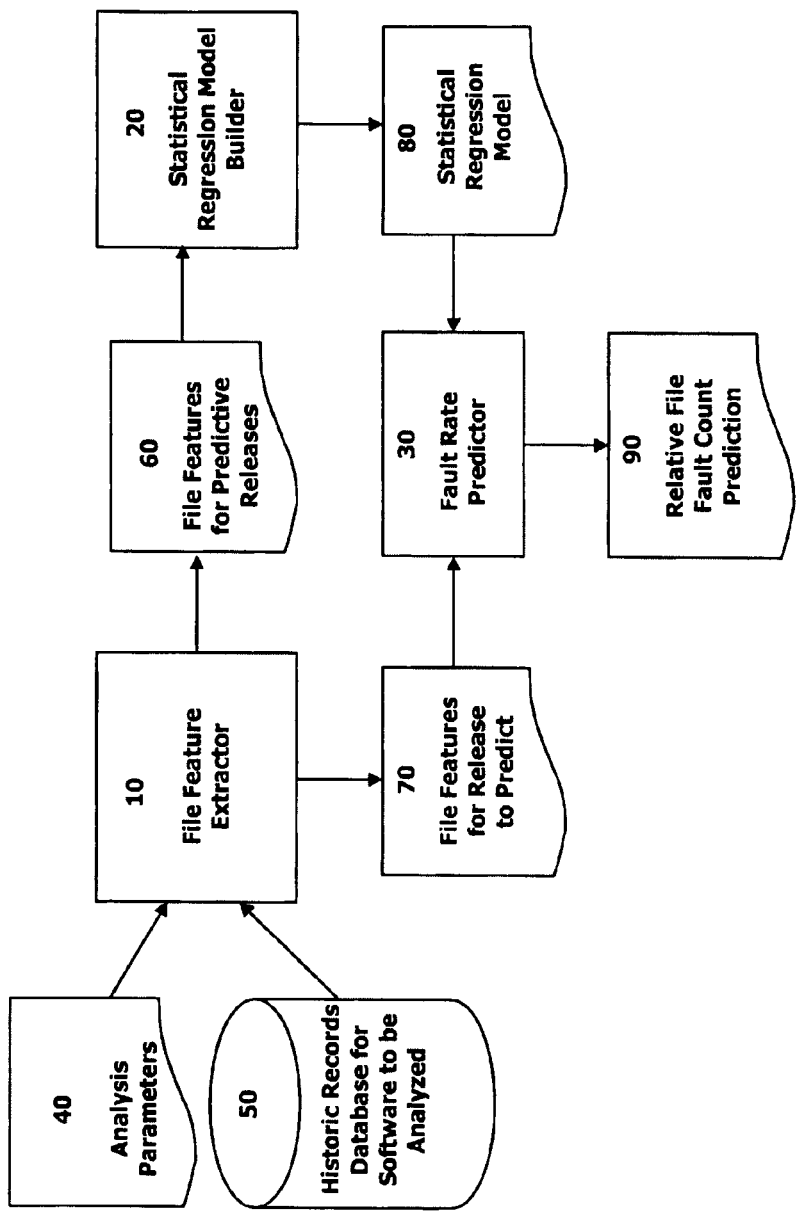

TOOL FOR PREDICTING FAULT-PRONE SOFTWARE FILES

BACKGROUND OF THE INVENTION

The present invention relates to an automated fault prediction tool and, more particularly, to an automated tool for identifying the files of a software system most likely to contain faults.

Large systems have hundreds or thousands of files, and testers frequently have little guidance to help determine which files should be most thoroughly tested. Previous work in fault prediction attempted to classify files as either fault-prone or not fault-prone. More particularly, this previous work involved making predictions using different models ranging from a simple Line-of-Code (LOC) model to customized binary tree and linear regression models. Not surprisingly, the custom models invariably predicted faults more accurately than the simple model. However, development of customized models requires substantial time and analytic effort, as well as statistical expertise.

There is, therefore, a need in the art for a new, more sophisticated model that yields more accurate predictions than the earlier LOC model, but which nonetheless can be fully automated, thereby eliminating or reducing the analytical effort and statistical expertise associated with customized models. In particular, there is a need in the art for an automated tool for testers and developers to identify the files most likely to be problematic in the future.

SUMMARY OF THE INVENTION

As a result, the present invention provides a software tool for predicting the fault-proneness of files (code units, modules, packages, etc) of large-scale, long-lived software systems. In contrast to prior art models, the present tool ranks files in decreasing order of their potential fault-proneness, thereby enabling testers to focus their efforts on the files most likely to contain faults in current and future releases. Predictions can also help solve the problem faced by developers of deciding which files need to be completely rewritten or replaced.

The tool includes at least three components:

Component 1. Data extraction: Collects information about the file and the development process from previous releases, and formats it for input to the analysis stage;

Component 2. Data analysis: Performs a statistical regression analysis on the collected data, and formulates a model to predict fault counts for the current and future releases; and Component 3. Model application: Computes an expected fault count for each unit of the current release, by applying the formulated model to data of the current release. The expected fault counts are used to rank the release's units in descending order of fault-proneness.

By using the tool's predictions to gain insight into the parts of the system most likely to contain faults, testers can concentrate their efforts on those parts, and perform more thorough and more effective testing in a given amount of time than would otherwise be possible. The tool's predictions can also be used by system developers to isolate parts of the system that are chronically fault-prone. This information can be used to guide decisions about which parts of the system should be rewritten, or discarded and redesigned.

A method of ranking software texts based on predicted faults associated therewith in accordance with the present invention, which incorporates some of the preferred features, includes calculating values of coefficients associated with a first set of equations, calculating values of fault counts using a second set of equations, and ranking the second set of software texts based on the values of fault counts associated with the second set of equations. The first set of equations includes values of feature vectors associated with a first set of software texts, and the first set of equations includes values of fault counts associated with the first set of software texts. The calculated values of fault counts is associated with a second set of texts, the second set of equations includes the calculated values of the coefficients associated with the first set of equations and values of feature vectors associated with the second set of texts, and the first and second sets of equations are based on an algorithm.

The values of coefficients associated with the first set of equations may be calculated using a statistical regression model, and the statistical regression model may include at least one of a negative binomial regression model and a Poisson model. At least one of the first set of software texts may be a prior version of at least one of the second set of software texts, and at least one of the first and second sets of software texts may be at least one of written in a computer programming language and be an electronically stored text file.

The feature vectors may include at least one of the programming language in which a software text is written, a quantity of defects found in a version of a software text associated with a prior release, a quantity of changes made to a software text during at least one prior release, a quantity of successive prior releases for which a software text had a prior version, a fraction of a duration of a release for which a version of a software text existed, and a quantity derived from any predictive features using at least one of scaling, quantization, linear combination, and application of transcendental functions. The method may also include grouping the first set of software texts by time into an ordered series of at least one release, and assigning the second set of software texts to a separate, most recent, release in the ordered series to define the feature vectors.

An apparatus adapted to rank software texts based on predicted faults associated therewith in accordance with the present invention, which incorporates some of the preferred features, includes a computing device. The computing device calculates values of coefficients associated with a first set of equations. The first set of equations includes values of feature vectors associated with a first set of software texts, and the first set of equations includes values of fault counts associated with the first set of software texts. The computing device calculates values of fault counts using a second set of equations. The calculated values of fault counts are associated with a second set of texts, the second set of equations including the calculated values of the coefficients associated with the first set of equations and values of feature vectors associated with the second set of texts. The first and second sets of equations are based on an algorithm, and the computing device ranks the second set of software texts based on the values of fault counts associated with the second set of equations.

A computer-readable medium in accordance with the present invention, which incorporates some of the preferred features, includes instructions, wherein execution of the instructions by at least one computing device ranks software texts based on predicted faults associated therewith by calculating values of coefficients associated with a first set of equations, calculating values of fault counts using a second set of equations, and ranking the second set of software texts based on the values of fault counts associated with the second set of equations. The first set of equations includes values of feature vectors associated with a first set of software texts, and the first set of equations includes values of fault counts associated with the first set of software texts. The calculated values of fault counts are associated with a second set of texts, and the second set of equations includes the calculated values of the coefficients associated with the first set of equations and values of feature vectors associated with the second set of texts. The first and second sets of equations are based on an algorithm.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWING

FIG. 1 is a top level flow chart for the automated tool of the present invention.

DETAILED DESCRIPTION OF THE INVENTION

Referring to FIG. 1, the tool of the present invention includes a File Feature Extractor 10, a Statistical Regression Model Builder 20, and a Fault Rate Predictor 30. The File Feature Extractor 10 receives as input a set of Analysis Parameters 40 and historical data from the Historic Records Database 50 for the Software to be Analyzed, and thereafter outputs a set of File Features for the Predictive Releases 60, and a set of File Features for the Release to Predict 70. The Model Builder 20 takes the sets of File Features for the Predictive Releases 60 and constructs a Statistical Regression Model 80 including a set of numeric coefficients. The Fault Rate Predictor 30 then applies the Statistical Regression Model 80 to the File Features of the Release to Predict 70 to produce a Relative File Fault Count Prediction 90.

The sets of file features 60, 70 that can be extracted by the File Feature Extractor 10 depend on what information has been retained in the Historic Records Database 50. There are a number of available commercial products that maintain such databases. These products are typically referred to as "source code control systems", "software configuration management systems" or "version management systems". "Software texts" as referred to herein is intended to include anything that could be construed as software, including, but not limited to source code, configuration files, executable specifications, and formal grammars.

In one preferred embodiment, the information in the Historic Records Database 50 is maintained in a manner which partitions the history of a software project into a sequence of "releases" (a.k.a. generics or versions) where each such release spans a time interval of the order of months and involves some set of code changes (typically to add new features to the software, to modify existing features, or to make corrections to existing code), and a testing or field deployment process where faults in the software are identified and corrected and where each release generally builds upon the preceding one. In addition, the information in the Historic Records Database 50 is preferably maintained in a manner which allows the system to determine, for each such release, when the release began (release-start-time), when it ended (release-end-time), and what files belonged to the release.

Finally, the information in the Historic Records Database 50 is preferably maintained such that it can be used to determine, for each such file in each such release, the name of the file, when it was first added to the release (or when it was inherited from the previous release), how many lines were in the file when it was first added to the release (or inherited), how many changes were made to the file during the release, and how many of these changes were in response to faults being identified in the software.

An example of such a database would be that maintained by Alcatel-Lucent's Sablime® Configuration Management System. In a large project with a long history, there is likely to be missing or inaccurate data in the database. Although this does not prevent use of the present tool, it does potentially reduce the accuracy of the outputted results. Typical reasons for this missing or inaccurate data include changes, over time, of the system used to track faults and changes (replacement of the records database), changes in how faults were distinguished from other changes to files, and importation of files with a long existing history from outside the project as new files in the project being analyzed.

In one preferred embodiment, the File Feature Extractor 10 reads a pre-selected set of Analysis Parameters 40, which includes the following:
  i) the location of the Historic Records Database;
  ii) the list of releases making up the history of the software project (i.e., the project releases, rel[0], rel[1], . . . , rel[n]);
  iii) the release, from the above list, for which a prediction is to be made (i.e., the Release to Predict, rel[P]);
  iv) the set of other releases, from the list, that are to be used to make the prediction (typically all or some of the releases prior to the Release to Predict, rel[0], rel[1], . . . , rel[P−1], (collectively referred to as the Predictive Releases);
  v) the criteria used in the Historic Records Database to indicate that a change to a file was in response to an identified fault; and
  vi) the set of file name suffixes indicating source code to be analyzed, for example, ".c", ".C", ".pC", ".ctl", ".sql", ".env", ".cfg", ".java", ".pl" (as opposed to image files, presentations, or other material that is not a potential source of faults or is not in the form of lines of written text).

The File Feature Extractor 10 then extracts from the Historic Records Database 50 information for each file with one of the specified file name suffixes (a "selected file") in a release from the list of releases making up the history of the project. Files added to the release at or after the start of the succeeding release are not considered. In one preferred embodiment, this information includes one or more of the following:
  a) the identifier of the release (release-name);
  b) the name of the file (file-name);
  c) the number of changes to the file during the release as a result of faults (faults);
  d) the number of changes to the file during the previous release as a result of fault corrections or 0 if the file was new with this release (prior faults);
  e) the number of changes to the file during the previous release (for all reasons, not just due to faults) or 0 if the file was new with this release (prior changes);
  f) the number of changes to the file during the release prior to the previous release (again, for all reasons) or 0 if the file was new with the previous release (prior changes)
  g) the number of lines of text in the file when it was first added to the release (LOC);
  h) the number of consecutive previous releases to which the file belonged (age);
  i) the moment when the file was added to the release (add-time); and/or j) for files inherited from a previous release, the add-time is equal to the start time of this release (release-start-time).

The File Feature Extractor 10 then computes a feature vector for each selected file in a project release as follows:
1) New File: assign a value of "1" if the "age" of the file is 0, otherwise assign a value of "0";
2) Age=1: assign a value of "1" if the "age" of the file is 1, otherwise assign a value of "0";
3) Age=2-4: assign a value of "1" if the "age" of the file is 2, 3, or 4, otherwise assign a value of "0"; and
4) Programming language: assign a value of "1" to the variable that corresponds to the file name suffix Next, the File Feature Extractor 10 preferably performs one or more of the following operations:
- calculating the natural logarithm of the fraction of the release's duration that the file belonged to the release: (ln((release-end-time—file-add-time)/(release-end-time—release-start-time));
- calculating the natural logarithm of the number of thousand-lines of text in the file when it was first added to the release or "0" if the number of lines is 0: ln(max(file-lines, 0.001));
- calculating the square root of the number of changes in the previous release: sqrt(file-prev-chgs);
- calculating the square root of the number of changes in the release before that: sqrt(file-prev-prev-chgs);
- calculating the square root of the number of changes due to faults in the previous release: sqrt(file-prev-faults); and
- assigning a value of "1" if release-name=rel[i], for each integer i: 0<i<P to provide an "in release i" feature, otherwise assigning a value of "0". (This will produce one less feature than there are releases used for prediction).

It is contemplated herein that additional features (depending on the application) may be used to "fine tune" the predictive output of the tool. For example, the set of file types assigned features may be varied for environments using different sets of programming languages.

The File Feature Extractor 10 then produces the table of File Features for Predictive Releases 60 which includes (for each of the selected files in each of the predictive releases) the file-faults and the above feature vector for that selected file in that predictive release. In addition, the File Feature Extractor 10 produces the table of File Features for the Release To Predict 70 which includes (for each of the selected files in the Release To Predict) the file name and the feature vector for that selected file in the Release To Predict.

Next, the Statistical Regression Model Builder 20 takes the table of File Features for Predictive Releases 60 and uses it to build a Statistical Regression Model 80 which includes a vector of coefficients, including a coefficient for each of the above features, and a "dispersion parameter".

The Fault Rate Predictor 30 then takes the table of File Features for the Release To Predict 70 and the Statistical Regression Model 80 and, for each selected file in the predicted release, computes a relative number of predicted faults. Methods for computing predicted values from feature values and regression models are also well known in the art and described in statistical literature, and software implementing these methods is typically provided as part of the same packages that contain regression model builders. Finally, the Fault Rate Predictor linearly scales the predictions so that they total 100 (yielding expected percentages of faults), sorts the files in descending order of their percentages and reports this as the Relative File Fault Count Prediction 90.

In particular, the present invention provides an algorithm establishing a relationship between selected file features and predicted fault counts, such algorithm including a plurality of coefficients and a plurality of feature vectors representing data derived from the file(s) of a prior release(s). An example of such an algorithm is set forth below:

$$K_0 + K_1(\log(KLOC)) + K_2(\text{New}) +$$
$$K_3(\text{Age} = 1) + K_4(\text{Age} = 2 \text{ to } 4) + K_5(\text{Log(Exposure)}) +$$
$$K_6(\sqrt{\text{prior changes}}) + K_7(\sqrt{\text{prior prior changes}}) +$$
$$K_8(\sqrt{\text{prior faults}}) + K_{Pi}(L_{Pi}) = \text{Linear Combo},$$

wherein $K_0$ is a constant selected to represent an axis intercept, $K_i$ are coefficients, the terms in parentheses are the feature vectors which are derived from data associated with a particular file, each $L_{Pi}$ is a variable corresponding to the $i^{th}$ particular programming language (Pi) used in the releases, each $K_{Pi}$ is a coefficient derived for language Pi, and the Linear Combo is the inverse natural log of the predicted fault count. The natural log of the predicted fault count is used to compress the range.

In order for a fault prediction tool to be widely usable by software developers and testers, it should require little or no user expertise in data mining, data analysis, or statistics, and should require minimal human intervention and manual overhead. Accordingly, the tool of the present invention can be integrated with automated data extraction tools, resulting in a tool that can be easily applied to predict fault-proneness for many types of large software systems.

Many of today's software systems use commercially available, integrated version control/change management systems. Any change made to the software system must be documented in a modification request (MR).

The present tool bases predictions on objectively assessable factors obtainable from the MRs and the version control system. These include file size; whether the file was new to the system in the sense that this is the first release in which it appeared; whether the file contained faults in earlier releases, and if so, how many; how many changes were made to the file in previous releases; and the programming language used to implement the file.

The data extraction part of the fault prediction tool should perform its tasks without human intervention. In one preferred embodiment, a common table-driven script that can be parameterized for each system is implemented. A generalized tool to perform the data extraction is also preferably implemented. This thus provides the back-end of the automated fault-proneness prediction system in accordance with the present invention.

Of course, it is quite possible that other development projects will use different modification request systems, with different data storage formats. For each such change management system encountered, a different back-end to the data extraction tool can be built so that practitioners will only have to select the MR system used and the appropriate databases will be accessed to extract the needed data. In each case, the extracted data will provide the information needed by the prediction portion of the tool in a uniform format.

EXAMPLE 1

This example describes use of the tool for a particular system. Data from 35 releases covering approximately nine years of field experience was analyzed. During that period, the number of executable files grew from 354 at the end of Release 1 to 668 at the end of Release 35, and the LOC grew to approximately 500,000. Intervals between releases generally ranged from three to five months, with the main exceptions being after Releases 1 (8.5 months), 2 (56 days) and 3 (40 days).

Each release after the first one included a combination of files that were new in the current release and others that existed in the previous release. New files might be added at any point during the lifetime of a release. Because files added early in a release had more chance to be tested and therefore more opportunity for faults to be detected, a variable called "Exposure" was defined, which is the fraction of the release for which a new file existed. The Exposure variable was set to 1 for all files that existed in the previous release.

Ten different languages contributed executable files to this system. At the last release, the most frequently used languages included C++ (28%), C++ with embedded SQL (28%), pure SQL (12%), CTL (data-loading scripts for SQL, 12%), and SH (6%).

MRs can be submitted for various reasons, including to report a system failure or problem, to request a maintenance update, or to request the addition of new functionality. In some change management systems, the standard MR form will not have a field that explicitly states the reason for its creation. In such cases, alternate means must be used to characterize MRs that represent faults. One such means is to define a "fault" MR as one that is submitted during certain stages of the software process, for example system test, end-to-end test, operations readiness test, user acceptance test, or customer usage. This example rule captures those MRs that are investigated and must be resolved following system integration, and provides a fairly close approximation to the MRs that are created because of an actual fault in the system. One fault is counted for each change made to an individual executable file in response to a fault MR. Therefore, if a given fault MR causes N different files to be changed, that is counted as N distinct faults.

Counted in this way, a total of 1545 faults was spread across the 35 releases. With the exceptions of four releases with fewer than 8 faults each, there were at least 18 faults during each release. The vast majority of all faults were encountered during an internal testing phase, prior to the software's release to customers.

MRs also provided information about the total number of changes to executable files during each release for reasons other than to fix faults. These might include planned enhancements, such as the addition of new features required for specific releases in the original requirements or specification document. Unplanned enhancements are also distinguished from faults and counted as changes but not faults. These might represent new features or functionalities added to the system that were not originally envisioned by the requirements writers. Changes of this sort are especially common in systems that have very long lifetimes, as new technology becomes feasible, and competitors' software systems provide new features.

For this example, negative binomial regression was used to model the number of faults in a file during a specific release. The unit of analysis is the combination of a file and release. That means that each file contributes as many observations to a regression as the number of eligible releases for which it existed. Negative Binomial Regression models are well known in the art and described in statistical literature. Construction of the model typically uses a successive approximation technique maximizing a log-likelihood function.

Negative binomial regression models the logarithm of the expected number of faults as a linear combination of the explanatory variables. Specifically, the expected number of faults equals $\gamma i e^{\beta'x}$, where the random variable $\gamma i$ has a gamma distribution with mean 1 and variance $\sigma^2 \geqq 0$. The variance $\sigma^2$, known as the "dispersion parameter", is included to account for greater variance in the fault counts than would be expected from a Poisson distribution.

In accordance with the present invention, model parameters are estimated by maximum likelihood. Once a model has been estimated, predicted numbers of faults are computed for every file in the next release, to prioritize files for purposes of testing and to alert developers that it might be desirable to rearchitect certain files.

The present tool uses a pre-specified model, whose coefficients are to be estimated from data for the current system. Although this alternative requires fitting negative binomial regression models at each release, it can also be automated. The coefficients to predict Release N are based on a model fit to Releases 2 to (N−1). The set of variables used are: log (KLOC); dummy variables for New files (Age=0), Age=1, and Age=2-4 (where applicable), with Age>4 as the reference set; the logarithm of Exposure; the square roots of changes in the prior release, changes in the prior prior release, and faults in the prior release; dummy variables for selected programming languages; and dummy variables for all but one release. To reduce the potential of overfitting for less prevalent programming languages, the model includes only those languages with a cumulative total of 20,000 LOC (20 KLOC) across releases, with an average of at least 2 KLOC per release in recent releases. This allowed dummy variables for files written in C or C++ immediately and for four additional languages after a few releases.

TABLE 1

Coefficients after Release 20

| Variable | Symbol | Coefficient |
|---|---|---|
| Log(KLOC) | $K_1$ | .519 |
| New file | $K_2$ | 1.865 |
| Age = 1 | $K_3$ | .918 |
| Age = 2-4 | $K_4$ | .355 |
| Log(Exposure) | $K_5$ | 1.117 |
| (Prior Changes)$^{1/2}$ | $K_6$ | .441 |
| (Prior Prior Changes)$^{1/2}$ | $K_7$ | .323 |
| (Prior Faults)$^{1/2}$ | $K_8$ | .387 |
| C++ | $K_9$ | −1.260 |
| C++ with SQL | $K_{10}$ | −.555 |
| m4 | $K_{11}$ | .389 |
| SQL | $K_{12}$ | −.162 |
| C | $K_{13}$ | −∞ |
| CTL | $K_{14}$ | .207 |

Table 1 displays the results of negative binomial regressions, fit to data through Release 20 (i.e., for predicting Release 21). The table omits results for the intercept and the dummy variables for releases, because those specific coefficients provide little, if any, insight about how the models would perform for other systems. Across releases, the estimated coefficients go up and down without any clear pattern. Excluding the programming language dummy variables, all the coefficients were statistically significant in the anticipated direction. The value of "−∞" in the row for C reflects the fact that no faults occurred through Release 20 for any files written in that language. "m4" is a special-purpose scripting language used in this particular system.

TABLE 2

Percentage of Faults in Top 20% of Files

| Release Number | Percent of Faults in Predicted Top 20% of Files |
|---|---|
| 2-5 | 55* |
| 6-10 | 78 |
| 11-15 | 71 |
| 16-20 | 84 |
| 21-25 | 89 |
| 26-30 | 90 |
| 31-35 | 92 |
| Mean % of Faults, Releases 3-35 | 81.3* |

*Starting with Release 3.

Table 2 summarizes prediction results for the system presented in this example. Using groups of five releases, we report the percentage of faults contained in the top 20% of files. The summary row shows the mean value over releases 3 through 35.

The results for the present Model (the pre-specified model) demonstrate that at least 80% of the faults on average were pre-selected. The model tended to improve over time as the amount of training data increased.

As discussed herein, the present model may be fully automated. In addition, the results from this model are comparable to those previously obtained using customized models.

EXAMPLE 2

This example illustrates the calculations used to compute fault predictions for a current release of a multi-release piece of software. In this regard, the raw data values set forth in Table 3 are fictional, and are intended for illustrative purposes only. The derived data values of Table 3 are calculated/determined from the raw data values.

The Linear Combo set forth in the Output Section of Table 3 is determined from the linear combination of the derived data values in accordance with the following algorithm:

$$K_0 + K_1(\log(KLOC)) + K_2(\text{New}) +$$
$$K_3(\text{Age} = 1) + K_4(\text{Age} = 2 \text{ to } 4) + K_5(\text{Log(Exposure)}) +$$
$$K_6(\sqrt{\text{prior changes}}) + K_7(\sqrt{\text{prior prior changes}}) +$$
$$K_8(\sqrt{\text{prior faults}}) + K_9(C++) + K_{10}(C++w/SQL) +$$
$$K_{11}(M_4) + K_{12}(SQL) + K_{13}(C) + K_{14}(CTL) = \text{Linear Combo}$$

TABLE 3

| | Raw Data Values | | | | | | Derived Data Values | | | | |
|---|---|---|---|---|---|---|---|---|---|---|---|
| File Num. | LOC | Age | Prior Changes | Prior Prior Changes | Prior Faults | File Type | Log (KLOC) | New | Age = 1 | Age = 2-4 | Log (exposure) |
| 1 | 160 | 0 | 0 | 0 | 0 | m4 | -0.80 | 1 | 0 | 0 | — |
| 2 | 312 | 1 | 3 | 0 | 2 | SQL | -0.51 | 0 | 1 | 0 | — |
| 3 | 400 | 3 | 0 | 2 | 0 | m4 | -0.40 | 0 | 0 | 1 | — |
| 4 | 60 | 9 | 4 | 0 | 2 | SQL | -1.22 | 0 | 0 | 0 | — |
| 5 | 1430 | 7 | 0 | 0 | 0 | CTL | -0.16 | 0 | 0 | 0 | — |
| 6 | 227 | 0 | 0 | 0 | 0 | C++ | -0.64 | 1 | 0 | 0 | — |
| 7 | 125 | 2 | 1 | 4 | 0 | C++ | -0.90 | 0 | 0 | 1 | — |
| 8 | 61 | 9 | 0 | 0 | 0 | HTML | -1.21 | 0 | 0 | 0 | — |
| 9 | 755 | 9 | 0 | 2 | 0 | C++ | -0.12 | 0 | 0 | 0 | — |
| 10 | 56 | 6 | 0 | 0 | 0 | C | -1.25 | 0 | 0 | 0 | — |

| | Derived Data Values | | | | | | | | Output | |
|---|---|---|---|---|---|---|---|---|---|---|
| File Num. | SQRT Prior Changes | SQRT Prior Prior Changes | SQRT Prior Faults | C++ | C++ w/ SQL | m4 | SQL | C | CTL | Linear Combo | Predicted Fault Count |
| 1 | 0.00 | 0.00 | 0.00 | 0 | 0 | 1 | 0 | 0 | 0 | 0.341 | 1.406 |
| 2 | 1.73 | 0.00 | 1.41 | 0 | 0 | 0 | 1 | 0 | 0 | 0.305 | 1.356 |
| 3 | 0.00 | 1.41 | 0.00 | 0 | 0 | 1 | 0 | 0 | 0 | -0.506 | 0.603 |
| 4 | 2.00 | 0.00 | 1.41 | 0 | 0 | 0 | 1 | 0 | 0 | -0.867 | 0.420 |
| 5 | 0.00 | 0.00 | 0.00 | 0 | 0 | 0 | 0 | 0 | 1 | -1.212 | 0.297 |
| 6 | 0.00 | 0.00 | 0.00 | 1 | 0 | 0 | 0 | 0 | 0 | -1.229 | 0.293 |
| 7 | 1.00 | 2.00 | 0.00 | 1 | 0 | 0 | 0 | 0 | 0 | -1.787 | 0.168 |
| 8 | 0.00 | 0.00 | 0.00 | 0 | 0 | 0 | 0 | 0 | 0 | -2.130 | 0.119 |
| 9 | 0.00 | 1.41 | 0.00 | 1 | 0 | 0 | 0 | 0 | 0 | -2.367 | 0.094 |
| 10 | 0.00 | 0.00 | 0.00 | 0 | 0 | 0 | 0 | 1 | 0 | -22.150 | 0.000 |

For purposes of this example, the values of $K_1$-$K_{14}$ from Table 1 have been inserted into the algorithm. The y-intercept $K_0$ has been assigned a value of -1.50, although the actual value of such number is not relevant to the overall ordering of the files. The coefficient of "-20.000" was used for "C" to represent the functional equivalent of minus infinity. Finally, the Log(exposure) was excluded from the calculation because old files for which predictions were derived were assumed to have equal exposure. In this regard, Table 3 does not include any values for Log(exposure).

In practice, the values for $K_1$-$K_{14}$ are determined by inserting data from earlier releases (including the mentioned feature vectors and actual fault counts) into the algorithm and using a binomial regression needed to solve for $K_1$-$K_{14}$. Having solved for $K_1$-$K_{14}$ based upon data and values from earlier releases, these coefficients are then inserted into the algorithm, together with the derived values for the feature vectors of the files from the new release, to solve for Predicted Fault Count.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendment and/or deviations be included within the scope of the following claims.

What is claimed is:

1. A method of identifying software texts likely to include faults, the method comprising:
    calculating, by a computing device, values of numerical coefficients included in a first set of equations representing linear combinations, the first set of equations including values of feature vectors associated with a first set of software texts, the first set of equations including values of fault counts associated with the first set of software texts;
    calculating, by the computing device, values of fault counts using a second set of equations representing linear combinations, the calculated values of fault counts being associated with a second set of texts, the second set of equations including the calculated values of the numerical coefficients included in the first set of equations and values of feature vectors associated with the second set of texts; and
    ranking, by the computing device, the second set of software texts based on the values of fault counts associated with the second set of equations.

2. The method defined by claim 1, wherein the values of the numerical coefficients included in the first set of equations are calculated using a statistical regression model.

3. The method defined by claim 2, wherein the statistical regression model includes at least one of a negative binomial regression model and a Poisson model.

4. The method defined by claim 1, wherein at least one of the first set of software texts is a prior version of at least one of the second set of software texts.

5. The method defined by claim 1, wherein at least one of the first and second sets of software texts is at least one of written in a computer programming language and be an electronically stored text file.

6. The method defined by claim 1, wherein the feature vectors include at least one of the programming language in which a software text is written, a quantity of defects found in a version of a software text associated with a prior release, a quantity of changes made to a software text during at least one prior release, a quantity of successive prior releases for which a software text had a prior version, a fraction of a duration of a release for which a version of a software text existed, and a quantity derived from any predictive features using at least one of scaling, quantization, linear combination, and application of transcendental functions.

7. The method defined by claim 1, further comprising:
    grouping the first set of software texts by time into an ordered series of at least one release; and
    assigning the second set of software texts to a separate, most recent, release in the ordered series to define the feature vectors.

8. An apparatus to identify software texts likely to include faults comprising a computing device, the computing device configured to:
    calculate values of numeric coefficients included in a first set of equations representing linear combinations, the first set of equations including values of feature vectors associated with a first set of software texts, the first set of equations including values of fault counts associated with the first set of software texts;
    calculate values of fault counts using a second set of equations representing linear combinations, the calculated values of fault counts being associated with a second set of texts, the second set of equations including the calculated values of the numerical coefficients included in the first set of equations and values of feature vectors associated with the second set of texts; and
    rank the second set of software texts based on the values of fault counts associated with the second set of equations.

9. The apparatus defined by claim 8, wherein the values of numeric coefficients included in the first set of equations are calculated using a statistical regression model.

10. The apparatus defined by claim 9, wherein the statistical regression model includes at least one of a negative binomial regression model and a Poisson model.

11. The apparatus defined by claim 8, wherein at least one of the first set of software texts is a prior version of at least one of the second set of software texts.

12. The apparatus defined by claim 8, wherein at least one of the first and second sets of software texts is at least one of written in a computer programming language and be an electronically stored text file.

13. The apparatus defined by claim 8, wherein the feature vectors include at least one of the programming language in which a software text is written, a quantity of defects found in a version of a software text associated with a prior release, a quantity of changes made to a software text during at least one prior release, a quantity of successive prior releases for which a software text had a prior version, a fraction of a duration of a release for which a version of a software text existed, and a quantity derived from any predictive features using at least one of scaling, quantization, linear combination, and application of transcendental functions.

14. The apparatus defined by claim 8, wherein the computing device is further configured to:
    group the first set of software texts by time into an ordered series of at least one release; and
    assign the second set of software texts to a separate, most recent, release in the ordered series to define the feature vectors.

15. A non-transitory computer-readable medium comprising instructions that, when executed by a computing device, cause the computing device to:
    calculate values of numerical coefficients included in a first set of equations representing linear combinations, the first set of equations including values of feature vectors associated with a first set of software texts, the first set of equations including values of fault counts associated with the first set of software texts;
    calculate values of fault counts using a second set of equations representing linear combinations, the calculated values of fault counts being associated with a second set of texts, the second set of equations including the calculated values of the numerical coefficients included in the first set of equations and values of feature vectors associated with the second set of texts; and
    rank the second set of software texts based on the values of fault counts associated with the second set of equations.

16. The non-transitory computer-readable medium defined by claim 15, wherein the values of the numerical coefficients included in the first set of equations are calculated using a statistical regression model.

17. The non-transitory computer-readable medium defined by claim 16, wherein the statistical regression model includes at least one of a negative binomial regression model and a Poisson model.

18. The non-transitory computer-readable medium defined by claim 15, wherein at least one of the first set of software texts is a prior version of at least one of the second set of software texts.

19. The non-transitory computer-readable medium defined by claim 15, wherein at least one of the first and second sets of software texts is at least one of written in a computer programming language and be an electronically stored text file.

20. The non-transitory computer-readable medium defined by claim 15, wherein the feature vectors include at least one of the programming language in which a software text is written, a quantity of defects found in a version of a software text associated with a prior release, a quantity of changes made to a software text during at least one prior release, a quantity of successive prior releases for which a software text had a prior version, a fraction of a duration of a release for which a version of a software text existed, and a quantity derived from any predictive features using at least one of scaling, quantization, linear combination, and application of transcendental functions.

* * * * *